(12) United States Patent
Li et al.

(10) Patent No.: US 9,792,434 B1
(45) Date of Patent: Oct. 17, 2017

(54) SYSTEMS AND METHODS FOR SECURITY DATA ANALYSIS AND DISPLAY

(71) Applicant: Knightscope, Inc., Mountain View, CA (US)

(72) Inventors: William Santana Li, Mountain View, CA (US); Arne Stoschek, Palo Alto, CA (US); Stacy Dean Stephens, Grand Prairie, TX (US); Mercedes Soria-Li, Mountain View, CA (US); Aaron J. Lehnhardt, Mission Viejo, CA (US); Dominic A. Villa, San Jose, CA (US); Phillip Wong, San Francisco, CA (US)

(73) Assignee: KNIGHTSCOPE, INC., Mountain View, CA (US)

( * ) Notice: Subject to any disclaimer, the term of this patent is extended or adjusted under 35 U.S.C. 154(b) by 0 days.

(21) Appl. No.: 14/751,124

(22) Filed: Jun. 25, 2015

Related U.S. Application Data

(63) Continuation of application No. 14/599,344, filed on Jan. 16, 2015, now abandoned.

(60) Provisional application No. 61/929,003, filed on Jan. 17, 2014.

(51) Int. Cl.
| | | |
|---|---|---|
| *G05D 1/02* | (2006.01) | |
| *G06F 21/55* | (2013.01) | |
| *G06F 21/57* | (2013.01) | |
| *G06F 21/62* | (2013.01) | |

(52) U.S. Cl.
CPC .......... *G06F 21/554* (2013.01); *G06F 21/577* (2013.01); *G06F 21/6218* (2013.01); *G06F 2221/031* (2013.01); *G06F 2221/034* (2013.01); *G06F 2221/2141* (2013.01)

(58) Field of Classification Search
CPC .. G06F 21/554; G06F 21/577; G06F 21/6218; G06F 2221/031; G06F 2221/034
See application file for complete search history.

(56) References Cited

U.S. PATENT DOCUMENTS

| 5,446,445 | A  | * | 8/1995 | Bloomfield | ............ | G08B 17/10 |
|---|---|---|---|---|---|---|
| | | | | | | 340/521 |
| 6,085,090 | A  | * | 7/2000 | Yee | ........................ | G01S 5/0027 |
| | | | | | | 342/450 |
| 6,343,242 | B1 | * | 1/2002 | Nomura | .................. | B25J 9/1676 |
| | | | | | | 318/568.11 |
| 6,374,155 | B1 | | 4/2002 | Wallach et al. | | |

(Continued)

OTHER PUBLICATIONS

Alexander V. Mirgorodskiy & Barton P. Miller, Autonomous Analysis of Interactive Systems with Self-Propelled Instrumentation, in Computing and Networking Conference, 2004.*

(Continued)

*Primary Examiner* — Sharon Lynch
(74) *Attorney, Agent, or Firm* — Wilson Sonsini Goodrich & Rosati

(57) ABSTRACT

Systems and methods are provided for improved security services. In one aspect, a method is provided for controlling an autonomous data machine situated near a monitored environment. The method comprises: obtaining security data from a plurality of data sources; analyzing the security data to generate an analysis result; determining, based on the analysis result, an action to be performed by the autonomous data machine; and transmitting a command to the autonomous data machine causing it to perform the action.

14 Claims, 10 Drawing Sheets

(56) References Cited

U.S. PATENT DOCUMENTS

| | | | |
|---|---|---|---|
| 6,429,617 B1 | 8/2002 | Sano et al. | |
| 7,030,757 B2* | 4/2006 | Matsuhira | G08B 13/19645 340/521 |
| 8,111,156 B2* | 2/2012 | Song | G08B 13/19647 340/539.22 |
| 8,473,143 B2* | 6/2013 | Stark | G07C 5/0891 701/28 |
| 8,744,626 B2* | 6/2014 | Johnson | A01D 34/008 700/250 |
| 9,329,597 B2 | 5/2016 | Stoschek et al. | |
| 2003/0229474 A1* | 12/2003 | Suzuki | G08B 25/009 702/188 |
| 2004/0095149 A1 | 5/2004 | Chen et al. | |
| 2006/0206289 A1 | 9/2006 | Stake et al. | |
| 2009/0143913 A1 | 6/2009 | Kim et al. | |
| 2009/0198376 A1 | 8/2009 | Friedman et al. | |
| 2011/0010010 A1 | 1/2011 | Kai et al. | |
| 2011/0135189 A1 | 6/2011 | Lee | |
| 2011/0288684 A1* | 11/2011 | Farlow | B25J 11/009 700/264 |
| 2012/0150966 A1* | 6/2012 | Fan | G06Q 10/107 709/206 |
| 2012/0185095 A1* | 7/2012 | Rosenstein | B25J 5/007 700/259 |
| 2013/0024025 A1 | 1/2013 | Hsu | |
| 2013/0117867 A1 | 5/2013 | Fung | |
| 2013/0123980 A1 | 5/2013 | Seo | |
| 2013/0325244 A1* | 12/2013 | Wang | G05D 1/028 701/26 |
| 2014/0009561 A1* | 1/2014 | Sutherland | B25J 5/007 348/14.05 |
| 2014/0180478 A1 | 6/2014 | Letsky | |
| 2014/0254896 A1* | 9/2014 | Zhou | B25J 9/0006 382/124 |
| 2014/0266669 A1* | 9/2014 | Fadell | G05B 19/042 340/501 |
| 2014/0316557 A1 | 10/2014 | Jones et al. | |
| 2014/0350725 A1 | 11/2014 | Lafary et al. | |
| 2015/0073598 A1* | 3/2015 | Rosenstein | B25J 5/007 700/264 |
| 2015/0145643 A1* | 5/2015 | Fadell | G06Q 10/083 340/5.51 |
| 2015/0154249 A1* | 6/2015 | Dave | G06Q 50/10 707/758 |
| 2015/0154263 A1* | 6/2015 | Boddhu | G06N 5/04 707/737 |
| 2015/0154501 A1* | 6/2015 | Boddhu | G06F 17/2765 706/52 |
| 2015/0158182 A1* | 6/2015 | Farlow | B25J 11/009 700/259 |
| 2015/0165895 A1* | 6/2015 | Menor | B60K 7/0007 701/23 |
| 2015/0185034 A1* | 7/2015 | Abhyanker | G01C 21/36 701/23 |
| 2015/0186378 A1* | 7/2015 | Berlingerio | H04L 12/1813 707/748 |
| 2015/0205298 A1* | 7/2015 | Stoschek | G05D 1/021 701/23 |
| 2015/0336270 A1* | 11/2015 | Storr | B25J 9/1674 700/245 |
| 2016/0019466 A1* | 1/2016 | Lightner | G06N 5/04 706/12 |
| 2016/0019470 A1* | 1/2016 | Lightner | G06N 5/04 706/12 |
| 2016/0148363 A1* | 5/2016 | Phan | G06T 7/001 348/142 |
| 2016/0205556 A1* | 7/2016 | Borghei | H04W 12/08 455/411 |

OTHER PUBLICATIONS

14751124 STIC Search Strategy (Requested May 26, 2017).*
U.S. Appl. No. 14/599,344, filed Jan. 16, 2015, Li et al.
Co-pending U.S. Appl. No. 14/751,115, filed Jun. 25, 2015.
Co-pending U.S. Appl. No. 14/836,857, filed Aug. 26, 2015.
Co-pending U.S. Appl. No. 15/215,540, filed Jul. 20, 2016.
Notice of allowance dated Jan. 6, 2016 for U.S. Appl. No. 14/599,073.
Office action dated Jun. 7, 2016 for U.S. Appl. No. 14/751,115.
Office Action dated Jul. 10, 2017 for U.S. Appl. No. 14/751,115.

* cited by examiner

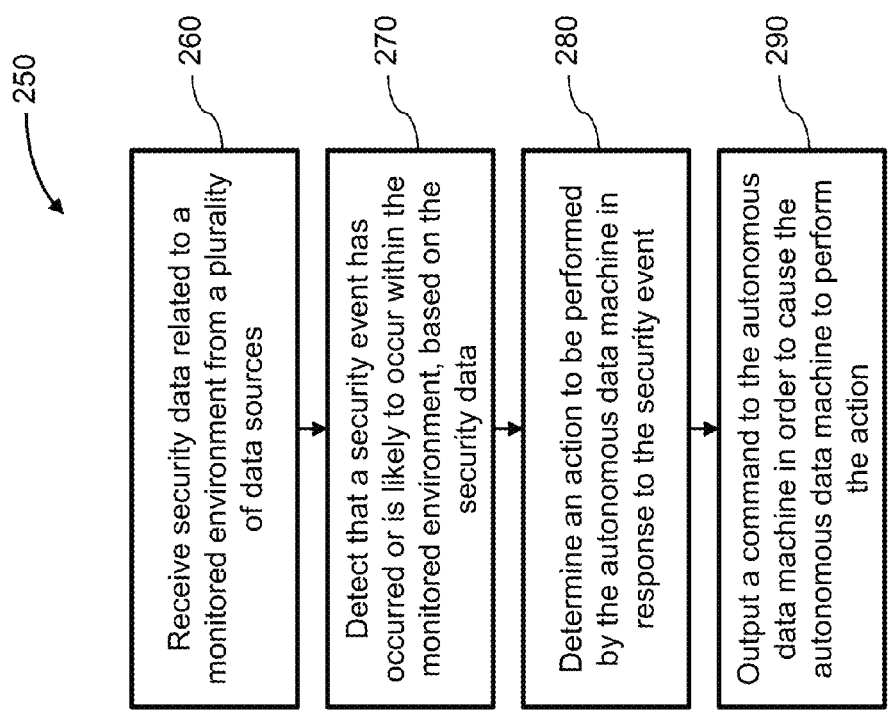

SYSTEMS AND METHODS FOR SECURITY DATA ANALYSIS AND DISPLAY

CROSS-REFERENCE

This application is a continuation application of U.S. application Ser. No. 14/599,344, filed Jan. 16, 2015, which claims the benefit of U.S. Provisional Application No. 61/929,003, filed Jan. 17, 2014, which applications are incorporated herein by reference.

BACKGROUND

Crime is a significant problem that has a large detrimental effect, both personally and economically. Security systems may be implemented to detect and/or prevent the occurrence of crime. Conventional security systems typically employ a combination of surveillance devices (e.g., cameras, alarms) and security personnel (e.g., security guards, law enforcement officers) in order to monitor an environment. In some instances, security data collected by a plurality of surveillance devices may be transmitted to a remote monitoring center. Existing security systems, however, may be costly to implement, due to the large number of security personnel needed for effective surveillance.

SUMMARY

A need exists for improved systems and methods for providing security services. In some embodiments, the security systems described herein obtain security data from a plurality of security data sources, analyze the security data (e.g., to detect and/or predict the occurrence security events), and provide the analysis results to one or more customers of the security services. The disclosed systems and methods facilitate the collection, analysis and evaluation of large volumes of security data, thereby increasing the resources available to security personnel for efficiently assessing and responding to critical situations. Additionally, various embodiments of the present disclosure provide methods and systems for controlling autonomous data machines based on the obtained security data, thus enhancing the capabilities of such machines to respond to detected and/or predicted security events.

Thus, in one aspect, the present disclosure provides a method for controlling an autonomous data machine situated near a monitored environment. The method comprises: obtaining security data from a plurality of data sources; analyzing the security data to generate an analysis result; determining, based on the analysis result, an action to be performed by the autonomous data machine; and transmitting a command to the autonomous data machine causing it to perform the action. In some embodiments, the plurality of data sources comprises at least one social media feed associated with the monitored environment In another aspect, a system for detecting and responding to security events within a monitored environment is provided. The system comprises a self-propelled autonomous data machine and one or more processors. The one or more processors can be individually or collectively configured to: receive security data related to the monitored environment from a plurality of data sources, the plurality of data sources comprising at least two of the following: a sensor, a social media feed, or a security database; detect that a security event has occurred within the monitored environment, based on the security data; determine an action to be performed by the autonomous data machine in response to the security event; and output a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the social media feed, and the occurrence of the security event is detected by at least detecting an increase in activity related to the security event on the social media feed.

In some embodiments, the system further comprises a display unit configured to display at least a subset of the security data to a user entity in a plurality of different visual contexts. The plurality of different visual contexts can comprise one or more of the following: a geographical map, a timeline, a social media feed, or a sensor feed.

In some embodiments, the one or more processors are further configured to transmit information regarding the security event to a user entity.

In some embodiments, the security event comprises at least one of the following: occurrence of a crime, occurrence of potential criminal activity, occurrence of an accident, or occurrence of an emergency.

In some embodiments, the action comprises navigating to a location associated with the security event. The action can comprise collecting data related to the security event using one or more sensors.

In another aspect, a method for detecting and responding to security events within a monitored environment using a self-propelled autonomous data machine is provided. The method comprises: receiving, at one or more processors, security data related to the monitored environment from a plurality of data sources, the plurality of data sources comprising at least two of the following: a sensor, a social media feed, or a security database; detecting, with aid of the one or more processors, that a security event has occurred within the monitored environment, based on the security data; determining, with aid of the one or more processors, an action to be performed by the autonomous data machine in response to the security event; and outputting, from the one or more processors, a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the social media feed, and detecting that the security event has occurred comprises detecting an increase in activity related to the security event on the social media feed.

In some embodiments, the method further comprises displaying at least a subset of the security data to a user entity in a plurality of different visual contexts via a display. The plurality of different visual contexts can comprise one or more of the following: a geographical map, a timeline, a social media feed, or a sensor feed.

In some embodiments, the method further comprises transmitting, with aid of the one or more processors, information regarding the security event to a user entity.

In some embodiments, the security event comprises at least one of the following: occurrence of a crime, occurrence of potential criminal activity, occurrence of an accident, or occurrence of an emergency.

In some embodiments, the action comprises navigating to a location associated with the security event. The action can comprise collecting data related to the security event using one or more sensors.

In another aspect, a system for responding to predicted security events within a monitored environment is provided. The system comprises a self-propelled autonomous data machine and one or more processors. The one or more processors can be individually or collectively configured to: receive security data related to the monitored environment from a plurality of data sources, the plurality of data sources comprising at least one of the following: a sensor, a social media feed, or a security database; determine that a predicted security event is likely to occur within the monitored environment, based on the security data; determine an action to be performed by the autonomous data machine in response to the predicted security event; and output a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the security database, and the security database comprises historical security data for the monitored environment.

In some embodiments, the system further comprises a display unit configured to display at least a subset of the security data to a user entity in a plurality of different visual contexts. The plurality of different visual contexts can comprise one or more of the following: a geographical map, a timeline, a social media feed, or a sensor feed.

In some embodiments, the one or more processors are further configured to transmit information regarding the predicted security event to a user entity.

In some embodiments, the predicted security event comprises at least one of the following: occurrence of a crime, occurrence of potential criminal activity, occurrence of an accident, or occurrence of an emergency.

In some embodiments, the action comprises navigating to a location associated with the predicted security event. The action can comprise collecting data related to the predicted security event using one or more sensors.

In another aspect, a method for responding to predicted security events within a monitored environment using a self-propelled autonomous data machine is provided. The method comprises: receiving, at one or more processors, security data related to the monitored environment from a plurality of data sources, the plurality of data sources comprising at least one of the following: a sensor, a social media feed, or a security database; determining, with aid of the one or more processors, that a predicted security event is likely to occur within the monitored environment, based on the security data; determining, with aid of the one or more processors, an action to be performed by the autonomous data machine in response to the predicted security event; and outputting, from the one or more processors a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the security database, and the security database comprises historical security data for the monitored environment.

In some embodiments, the method further comprises displaying at least a subset of the security data to a user entity in a plurality of different visual contexts via a display. The plurality of different visual contexts can comprise one or more of the following: a geographical map, a timeline, a social media feed, or a sensor feed.

In some embodiments, the method further comprises transmitting, with aid of the one or more processors, information regarding the predicted security event to a user entity.

In some embodiments, the predicted security event comprises at least one of the following: occurrence of a crime, occurrence of potential criminal activity, occurrence of an accident, or occurrence of an emergency.

In some embodiments, the action comprises navigating to a location associated with the predicted security event. The action can comprise collecting data related to the predicted security event using one or more sensors.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2B illustrates a method for detecting and responding to security events, in accordance with embodiments;

DETAILED DESCRIPTION

Figure 1:
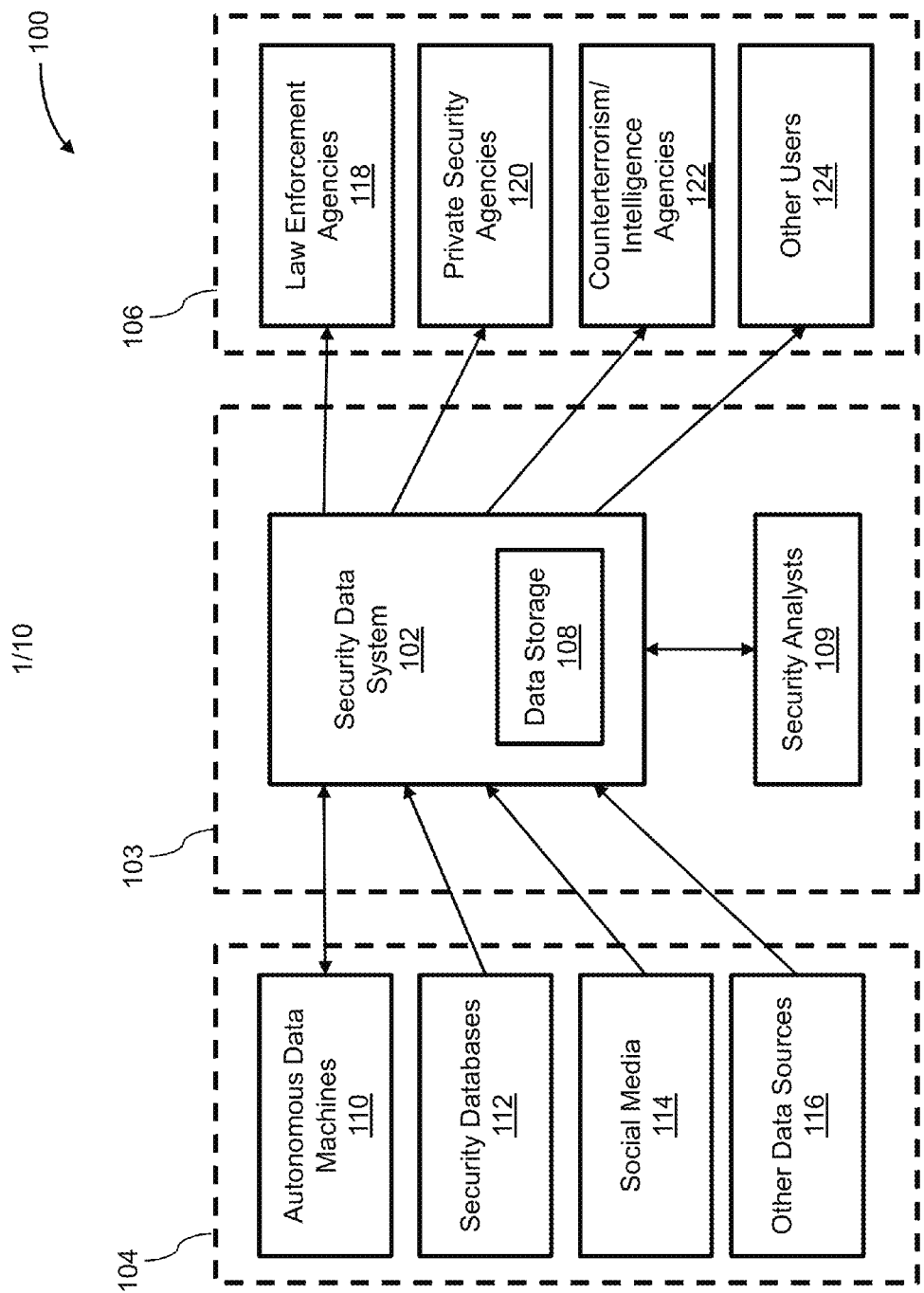
FIG. 1 illustrates an example topology in which a security data system may be implemented, in accordance with embodiments.

The systems and methods of the present disclosure provide improved techniques for the processing and analysis of security data. In some embodiments, the systems and methods described herein enable analysis of security data collected from a plurality of data sources and provide the results of the analysis to user entities in order to facilitate situation assessment, decision-making, and resource deployment. This approach may be used in conjunction with autonomous data machines configured to provide surveillance data of a local environment, thereby reducing the expenditures and resources needed for maintaining the desired level of security.

Security data may refer to any data generated and/or obtained for security purposes, including but not limited to surveillance, asset protection (which may encompass the protection of non-living assets (e.g., material items, property) as well as living assets (e.g., human beings)), law enforcement, counterterrorism, and the like, as well as any data that may be relevant to such activities. Security data can encompass data of any type, such as data files, data streams, data feeds, and the like. Such data may be of any size or format, and may be static or dynamic (e.g., real-time data). Examples of security data include but are not limited to: images, video, and/or audio data of a monitored environment (e.g., security camera footage); information regarding the identity and/or characteristics of entities of interest (e.g., license plate numbers of parked vehicles, facial recognition data of human entities); historical information regarding previous occurrences of crime or other security-related incidents (e.g., historical crime rates for a specified neighborhood); news a and/or social media content related to ongoing security events (e.g., blog posts describing occurrence of a crime), or combinations thereof.

Security data may originate from a variety of security data sources, including databases (e.g., public or private), servers, sensors (e.g., image sensors such as cameras, audio sensors such as microphones, thermal sensors, infrared sensors, proximity sensors such as LIDAR or ultrasonic sensors, motion sensors, position sensors such as global positioning systems (GPS), weather and other environmental sensors, etc.), surveillance devices (e.g., security cameras, alarms), security systems, human entities and/or organizations (e.g., security personnel, law enforcement agencies), or social media (e.g., dynamic feeds and/or static content). In some embodiments, a security data sources provides security data related to a specific monitored environment (e.g., public or private property such as a building, parking lot, street, etc.). In such instances, the security data source can be physically located near or within the monitored environment, such as a security camera located within a monitored building.

In some embodiments, security data can be obtained from an autonomous data machine, which can refer to a robotic device configured to navigate autonomously within an environment and collect data for security purposes. The autonomous data machine can be self-propelled, e.g., via one or more propulsion units (e.g., wheels, rotors, propellers). The autonomous data machine may collect data from the surrounding environment using a plurality of sensors (e.g., image sensors such as cameras, audio sensors such as microphones, thermal sensors, infrared sensors, proximity sensors such as LIDAR or ultrasonic sensors, motion sensors, position sensors such as global positioning systems (GPS), weather and other environmental sensors including barometric pressure, temperature, humidity, pollution, smoke, $CO2$, noise, sensors for radiation, chemical and biological agents or hazards, sensors for electromagnetic radiation, sensors for presence and identity of radio, cellular or wireless devices, etc.). In some embodiments, at least some or all of the sensors carried by the autonomous data machine can serve as security data sources used to obtain security data. Data collected by the autonomous data machine may be transmitted to a suitable security data system in real-time, as described in further detail below. Exemplary autonomous data machines suitable for use with the embodiments provided herein are described in co-pending and commonly owned U.S. patent application Ser. No. 14/599,073, filed herewith, entitled "Autonomous Data Machines and Systems", the entirety of which is incorporated herein by reference.

The security data obtained by one or more security data sources can be transmitted to a security data system. In some embodiments, the security data system receives data from a plurality of different data sources (e.g., at least two, three, four, five, or more data sources). At least some or all of the data sources can be of different types (e.g., at least two, three, four, five, or more different types), such that various different types of security data are provided to the system. The security data provided to the system can be related to a single monitored environment, or a plurality of different monitored environments. The security data system can be situated at a location remote from the monitored environment(s) and/or the data sources. Alternatively, the security data system can be located within close proximity of the monitored environment(s) and/or the data sources.

The security data system can perform various operations on the received security data, such as storage, aggregation, filtering, displaying, analysis, processing, transmitting to another entity, or combinations thereof. Such operations can be performed autonomously, semi-autonomously, or manually with aid of a user. In some embodiments, the system analyzes the received data in order to detect and/or predict the occurrence of a security event within a monitored environment. Examples of security events include but are not limited to: occurrence of a crime, occurrence of potential criminal activity, occurrence of an accident, or occurrence of an emergency. The security data system can then determine an appropriate response to the security event, e.g., alerting a user entity such as a law enforcement agency.

In some embodiments, the security data system uses the security data as a basis for controlling one or more autonomous data machines. For example, the system can command an autonomous data machine to monitor a specified environment, e.g., by collecting sensor data of the environment. As another example, the system can instruct the autonomous data machine to respond to a security event that has occurred, is ongoing, or is predicted to occur within a monitored environment. The system can be situated at a location remote from the autonomous data machines, thereby allowing for remote monitoring and control of machine activity. The use of autonomous data machines in conjunction with the security data system receiving data from security data sources as described herein can allow for automated detection of and response to security events, thereby reducing human resources needed to provide security services.

FIG. 1 illustrates an example topology 100 in which a security data system 102 may be implemented. The security data system 102 can be employed by a security "control center" 103 acting as an interface between a plurality of security data sources 104 and user entities 106. The control center 103 may also be referred to herein as a "security operations center" or "network operations center." In some instances, the control center 103 may be an organized entity providing security services to one or more of the user entities 106, which may also be referred to herein as "customers." The control center 103 can be located at a single centralized physical site or a plurality of decentralized physical sites, and may be situated remotely from the environment(s) in which security operations take place.

The security data system 102 can include a data storage 108, which can be any storage system suitable for storing security data obtained from the data sources 104. The system 102 and/or the associated data storage 108 can be implemented across any suitable combination of physical or virtualized computing resources, (e.g., physical machines, virtual computing instances, virtualized storage systems, etc.) associated with the control center 103. In some embodiments, such resources may include distributed ("cloud") computing resources. Some or all of these resources may be situated at the physical location(s) of the control center 103. Alternatively, the system 102 and/or data storage can be implemented entirely at sites remote from the control center 103. In some instances, some or all of the components and/or functionalities of the system 102 may be integrated with existing security infrastructure and control setup of the user entities 106, via suitable interfaces (e.g., user entity-specific interfaces).

The control center 103 can include one or more security analysts 109, which may be personnel working in conjunction with the security data system 102 to provide security services to the user entities 106. In some embodiments, the system 102 may be fully automated, such that the security analysts 109 are optional and/or primarily intended to maintain normal operation of the system 102. Alternatively, some or all of the functions performed by the system 102 may require human intervention from the security analysts 109. For example, various functions may be performed partially or entirely by the security analysts 109. Any part of the functionalities described herein as being performed by the system 102 can also be performed by any suitable combination of the system 102 and the security analysts 109.

The security data sources 104 can include any devices, systems, or entities providing data relating to security purposes. For example, the data sources 104 can include autonomous data machines 110, security databases 112 (e.g., databases provided by law enforcement agencies, intelligence agencies, government, private security agencies), social media 114 (e.g., social media sites or feeds such as Facebook®, Twitter®), as well as other types of data sources 116 (e.g., surveillance devices and other sensors (e.g., fixed cameras, mobile phones), maps, weather information, directories). In some embodiments, the security data system 102 is situated at a location remote from some or all of the security data sources 104. The security data system 102 can be connected to the security data sources 104 using any suitable method, including wired or wireless communication (e.g., local area networks, wide area networks, telecommunication networks such as 3G or 4G cellular networks, cloud networks, WiFi, Ethernet, etc.). The system 102 can maintain a continuous connection with the security data sources 104. Alternatively, the system 102 may elect to connect to the data sources 104 only at certain times (e.g., when querying the data source for information). In some instances, such connections may be initiated by the data sources 104 (e.g., in response to a detected event) rather than by the system 102.

The security data system 102 can be implemented as a repository for storing and/or organizing security data originating from the security data sources 104. The data may be stored in the data storage 108 of the system 102. For example, data obtained by the autonomous data machines 110 can be transmitted to the system 102 (e.g., as a real-time data stream) and accumulated within the data storage 108. The system 102 may be used to store all of the data obtained from the data sources 104. Alternatively, in order to improve storage efficiency, only some of the data may be stored. Determination of the data to be stored may be based on required data fidelity, required retrieval time, relevance of the contained information, or any other suitable criterion. For example, the system 102 may elect not to store static information or information that is already being stored elsewhere (e.g., in a preexisting database). The system 102 may store the security data in a manner such that it can be searched and/or retrieved (e.g., in response to a request by a user entity 106 or a security analyst 109, or by the system 102 for future analysis).

In some embodiments, the system 102 can be configured to analyze the obtained security data, e.g., with aid of one or more processors. As previously mentioned, the analyses described herein can be entirely automated. Alternatively, some or all of the analyses may involve user interaction (e.g., input provided by the security analysts 109). In some embodiments, an initial analysis of the security data may be performed automatically by the system 102, then further refined by the security analysts 109. Such human-machine interactivity may advantageously combine the capabilities of the system 102 to process large volumes of data with the abilities of human analysts to evaluate and act upon such data, thereby improving the efficiency and quality of the analysis.

The security data analysis may involve calculating statistics and/or metrics, parsing (e.g., to identify the occurrence of keywords or other key values), aggregating, comparing with other data sets (e.g., data from other data sources, historical data), and so on. In some embodiments, image analysis techniques can be applied to suitable image data (e.g., photographs, videos, thermal images, infrared images, LIDAR images), such as facial recognition, optical character recognition (e.g., of street signs, license plates), or other pattern recognition methods. Similarly, audio analysis techniques such as voice analysis can be applied to suitable audio data. Furthermore, the process of analyzing the security data may involve annotating the data with objective criteria in order to support successive data analytics, such as for behavioral and predictive analysis. For example, the data can be annotated to include information such as time, date, location, data source, data type, or any other relevant parameters. Such annotations may be used, for instance, to index the data for searching.

Additionally, the system 102 may identify and/or classify events based on the security data. An event can include any security-related occurrence, such as the occurrence of a crime or potentially criminal activity, triggering of a security alarm or other surveillance device, placing of an emergency call, and so on. An event may involve a change in state of an entity of interest (e.g., an individual moving from one location to another, an increase in social media activity, etc.). In some embodiments, an event may be based on data obtained by one or more sensors (e.g., of the autonomous data machine 110 or other surveillance devices), such as abnormal or unexpected sensor values; sensor values achieving, exceeding, or falling under certain values or ranges of values (e.g., a noise level exceeding a predetermined threshold); sensor values indicative of security-related occurrences (e.g., image analysis detecting the presence of an intruder), and so on. The identified events may be classified using any suitable criterion, such as time, date, location, event type, significance, associated annotations, and so on. When desired, the events can be stored and indexed for search, such that a user entity 106 or security analyst 109 can retroactively query the system 102 for information relating to the event.

As another example, the system 102 may perform mapping and/or data aggregation in order to condense the information represented by the security data into a more comprehensible format and extract the key concepts found in the data. In some embodiments, a plurality of security data sets from different data sources can be aggregated into a single context (e.g., spatial, temporal, geographical, etc.). Aggregation may be applied to data of diverse types, formats, and sources, such that heterogeneous data can be presented to a user entity in a unified setting. For example, the aggregated data may be provided to a user entity as a map depicting how various data sets relate to each other (e.g., spatially, temporally, geographically, etc.). A map may be a visual representation of a plurality of data (e.g., a 2D or 3D graphical map). Alternatively, maps may be presented in other formats (e.g., an "audio map" generated by combining a plurality of audio samples which may be analyzed spatially). Where desired, maps may be based on static data (e.g., a preexisting geographical map), or may be dynamically generated based on obtained data (e.g., sensor data, such as from sensors of an autonomous data machine), or suitable combinations thereof. For example, a spatial map of an environment may include a point cloud generated based on 3D sensor data (e.g., LIDAR data) supplemented with additional data (e.g., camera data, thermal imaging data, audio data, etc.). The maps described herein can include dynamic and/or interactive elements. For instance, a map may be updated based on the underlying data (e.g., in real-time, at specified time intervals, when an event occurs, etc.). Such maps may be presented to a user entity 106 and/or a security analyst 109 via a suitable user interface (UI), as described below.

In a further example, the system 102 can create a profile of a monitored environment (e.g., neighborhoods, buildings) based on the security data. The profile can include information regarding one or more objects within the environment (e.g., vehicles, equipment, boxes, structures, buildings people). In some instances, the profile can include information regarding types of objects (e.g., cars, trucks, buildings, people) and/or specific instances of objects (a specific car, a specific person) associated with the profiled entity. The profile can be with respect to one or more parameters of the objects, such as quantity, motion, occurrence, location, or time. For example, the profile may include information on when and where a car with a specific license plate moved. As another example, the profile may include information on how many cars passed in a specific location and direction during a given time interval. In some instances, the profile can include historical data and/or predictive data relating to the environment and/or any associated objects. Such profile information may also be of interest to user entities that are not necessarily directly affiliated with security organizations, as described below.

In some embodiments, the system 102 can utilize the security data and/or the analyses described herein to generate predictive security assessments. The predictive security assessment can include estimations of the probability that a specified event (e.g., the occurrence of a crime) will occur, as well as predictions regarding other parameters associated with the event, such as the time, location, or type (e.g., type of crime) of the event. The assessment can also include predictions regarding security-related trends, statistics, or other characteristics applicable to a collection of events. The prediction can be generated by the system 102 based on risk parameters, time, location, historical data, behavioral analysis, and the like. In some embodiments, the system 102 can implement machine learning techniques in order to improve the accuracy of such assessments.

The predictive security assessments can be used to facilitate decision-making related to security, such as determining current and future impacts on security measures (e.g., need for and type of security monitoring devices and/or security personnel). The assessments can also be used to optimize the cost and effectiveness of security installations at a given location and/or time (e.g., relative to an insurance setup). Furthermore, the predictive security assessment can also be used to make other types of predictions. For example, the assessment can be utilized to determine the current and future impacts on real estate (e.g., value, maintenance costs), insurance (e.g., personal and/or property insurance, such as for a localized area (e.g., street block, individual houses or properties), for a specific time, or varying with time (e.g., during "peak" crime seasons in a specific period during the year)), and the like.

The system 102 may also use the analysis results to generate alerts. The alerts can be provided to user entities 106 and/or security analysts 109 in order to provide notification of relevant security events. For example, upon detecting that a critical security event has occurred (e.g., a crime has been committed), the system 102 may alert the security analysts 109, such that immediate actions can be taken to respond to the critical event. Such alerts can be transmitted to the user entities 106 and/or the security analysts 109 via a suitable UI of the system 102, as well as through other communication means (e.g., email, texts, social media). In some instances, the system 102 may enable the user entities 106 and/or security analysts 109 to specify conditions under which an alert is generated (e.g., when a specific type of event has occurred at a specific location, when a specific event occurs within a specific time interval).

The system 102 may provide the obtained security data and/or analysis results to one or more user entities 106. The user entities 106 may include security organizations such as law enforcement agencies 118, private security agencies 120, or counterterrorism or intelligence agencies 122. For example, the security organizations may utilize the information obtained from the system 102 in order to conduct forensics (e.g., for counterterrorism efforts, criminal investigations), evaluate and/or optimize their existing security infrastructure, respond to current security events, prepare for predicted security events, and so on. Additionally, in some embodiments, information may also be provided to other users 124, which may include user entities that are not directly affiliated with security organizations (e.g., mapping service providers, location-based service providers, construction companies, logistics companies, traffic analysts, parking providers, insurance providers, shopping facilities and other commercial entities, individual users, etc.). In some embodiments, only a subset of the security data and/or analysis results may be transmitted to the user entities 106, based on suitable criteria (e.g., relevance, significance, customer preferences). Conversely, all of the security data and/or analysis results obtained by the system 102 may be provided to the user entities 106. The security data and/or analysis results can be directly provided to the user entities 106 by the system 102 and the user entities 106. In such instances, the security analysts 109 can provide real-time review, decision support, mission planning, or security services to the user entities 106 in addition to communicating the security data and/or analysis results.

The security data and/or analysis results can be presented to the user entities 106 in any suitable manner, including visual representations (e.g., via a suitable graphical UI), and can be transmitted to a suitable device associated with the user entities 106 (e.g., computer, tablet, mobile device). The visual representations can be designed in order to facilitate user comprehension of the presented security data. For example, at least a subset of the security data and/or analysis results can be displayed to a user entity 106 (e.g., on a display unit such as a monitor or screen) in a plurality of different visual contexts (e.g., geographical map, timeline, social media feed, sensor feed, or combinations thereof). Additionally, in some embodiments, selected security-related information can also be made available to the general public (e.g., via a publicly accessible website, social media feed, etc). This "crowd-sourced" security may enable members of the general public to engage with and/or contribute to security provided by the system 102, which may serve as an important feedback loop to the prediction algorithms implemented by the system 102. Furthermore, public dissemination of such information may alleviate privacy concerns as well as enhance the ability of the public to participate in reducing crime.

In addition to providing the data analysis functionalities described herein, the system 102 can also be implemented as part of a control center 103 configured to monitor and/or direct the activities of one or more autonomous data machines 110. As previously described, the autonomous data machines 110 can transmit security data to the control center 103, and such security data can be analyzed and provided to user entities 106. Furthermore, the analysis results can be used to determine one or more actions to be performed by the autonomous data machines 110 (e.g., to respond to a security event). For example, the security analysts 109 at the control center 103 may direct the autonomous data machine 110 to: interact with the surrounding environment as well as with entities (e.g., people) within the environment; obtain data of a monitored environment (e.g., via one or more sensors); navigate towards or away from a location associated with a security event; and so on. When desired, the autonomous data machines 110 can be configured to communicate with people, such as via displayed images, text-to-speech synthesis (e.g., generated by an analyst 109 or automatically), or any other suitable method.

Figure 2A:
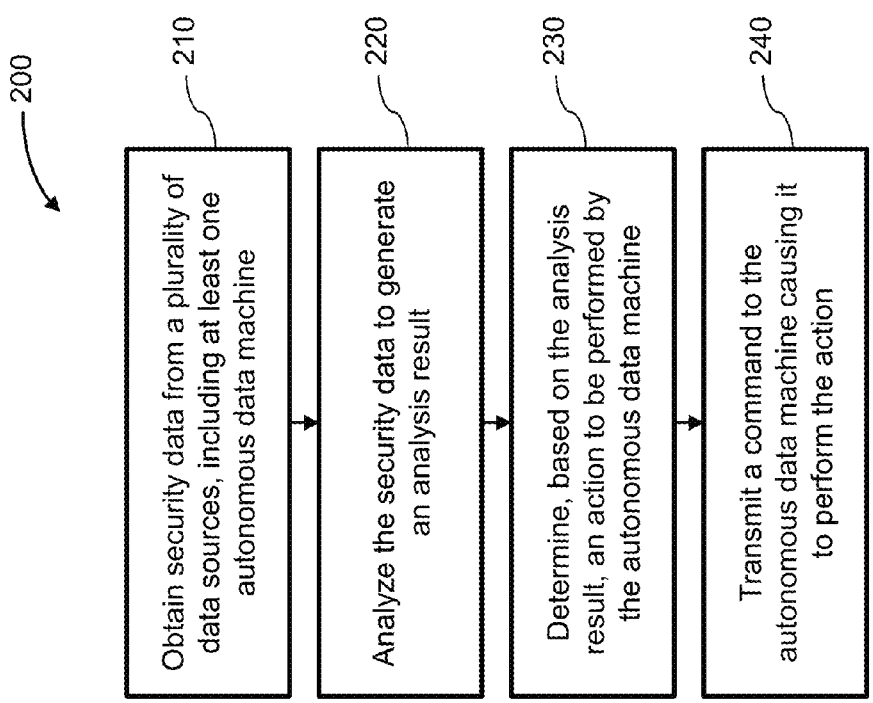
FIG. 2A is a schematic illustration of a method for controlling an autonomous data machine, in accordance with embodiments.

FIG. 2A is a schematic illustration of a method 200 for controlling an autonomous data machine, in accordance with embodiments. The method 200 can be practiced by any embodiments of the security data systems described herein, as well as by security analysts or other personnel interacting with such systems at a suitable control center. In some embodiments, some or all of the steps of the method 200 are performed with aid of one or more processors.

In step 210, security data is obtained from a plurality of data sources, including at least one autonomous data machine. The data sources can include any of the security data sources described herein, e.g., a social media feed, security database, sensor, etc. In some embodiments, the data sources, including the autonomous data machine, are situated at a location remote from the control center, and the security data is transmitted to the control center using suitable long-distance communication methods.

In step 220, the security data is analyzed to generate an analysis result. The analysis can be performed by a security data system, security analyst, or suitable combinations thereof, and can include any of the analyses previously described herein. In some embodiments, the security data can be analyzed in conjunction with preexisting data, such as historical security data.

In step 230, based on the analysis result, an action to be performed by the autonomous data machine is determined. The action can be determined automatically by the security data system, by the security analyst, or suitable combinations thereof. The action can be any action performable by the data machine, such as movement (e.g., to a different location, towards a target, away from a target, returning to a "home" location), collecting data (e.g., of a target, using a specified sensor or sensors), communication (e.g., with a person via images or synthesized speech, with the control center), or suitable combinations thereof.

In step 240, a command is transmitted to the autonomous data machine causing it to perform the action. The command can be transmitted using a long-distance communication method, similar to step 210.

FIG. 2B illustrates a method 250 for detecting and responding to security events within a monitored environment, in accordance with embodiments. The various steps of the method 250 can be performed by one or more processors of the security data systems described herein. Optionally, one or more steps of the method 250 can be performed with aid of a human operator, e.g., a security analyst. The method 250 can be repeated at predetermined time intervals in order to provide periodic updates regarding the security status of a monitored environment.

In step 260, security data related to a monitored environment is received from a plurality of data sources. The data sources can include any number and combination of the security data sources described herein. In some embodiments, the data sources include at least one of a sensor, a social media feed, or a security data base. In alternative embodiments, the data sources include at least two of a sensor, a social media feed, or a security database. The sensor can be stationary (e.g., affixed to a stationary support such as a wall) or mobile (e.g., self-propelled or carried by a mobile object). Optionally, the sensor can be carried by an autonomous data machine as previously described herein.

In step 270, it is detected that a security event has occurred or is likely to occur within the monitored environment, based on the security data. For example, the step 270 can involve detecting that a security event has occurred (e.g., a past or ongoing security event). Alternatively or in addition, the step 270 can involve determining that a predicted security event is likely to occur in the future. Various approaches can be used to detect and/or predict security events using security data, e.g., the analyses and assessments previously described herein in connection to FIG. 1. For example, in embodiments where the data sources include a social media feed, an increase in activity related to the security event on the social media event (e.g., increased frequency of blog posts or social media tags) can indicate the occurrence of the event. As another example, in embodiments where the data sources include a security database, historical security data for a monitored environment (e.g., trends in previous criminal activity) can indicate the likelihood that a predicted security event is likely to occur.

In step 280, an action to be performed by the autonomous data machine in response to the security event is determined. The determination can be performed automatically (e.g., by one or more processors), manually (e.g., with user input from a security analyst), or combinations thereof. Various types of actions can be performed by the autonomous data machine to respond to a previous, ongoing, or predicted security event, as previously described herein. For example, the action can involve the autonomous data machine navigating to a location associated with the security event (e.g., the location where the security event occurred or is predicted to occur). As another example, the action can involve the autonomous data machine collecting data related to the security event using one or more sensors (e.g., collecting image data at the scene of a crime).

In step 290, a command is outputted to the autonomous data machine in order to cause it to perform the action, similar to the step 240 of the method 200.

Figure 3:
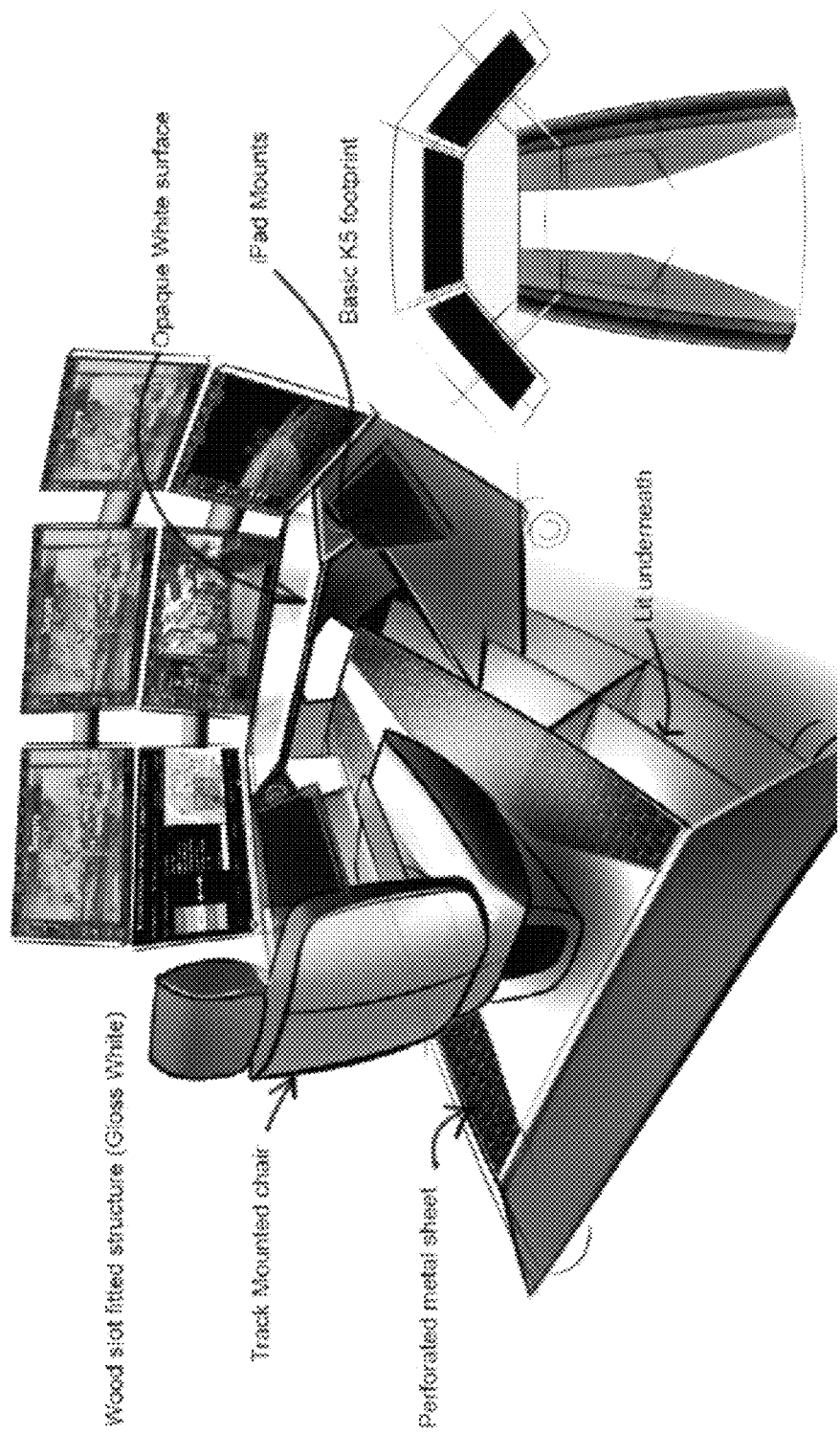
FIG. 3 illustrates a control center interface for a security analyst, in accordance with embodiments.

FIG. 3 illustrates a control center interface for a security analyst, in accordance with embodiments. The interface can be used by the security analyst to view security data and/or analysis results, analyze data, monitor and/or direct the activity of various surveillance apparatus (e.g., autonomous data machines), and/or communicate with user entities. The control center interface can include a suitable support platform upon which the analyst can be seated (e.g., a track-mounted chair). The interface can be connected to the security data system and include a plurality of display units (e.g., monitors, tablets, screens) for displaying security data and/or data analysis results provided by the security data system. In some embodiments, the display units can display real-time feeds of security data obtained by one or more sensors of an autonomous data machine, thereby enabling the security analyst to monitor the activity of the autonomous data machine. At least some of the display units can be configured to accept user input (e.g., provided by a mouse, keyboard, joystick, touchpad, gesture, voice command, etc.), which may be used to interact with the displayed information and enable the security analyst to perform some or all of the tasks described herein.

The security data and/or data analysis results provided by the security data system can be visually presented in the context of a suitable UI. Any of the UIs described herein can be displayed to a security analyst via a suitable control center interface (e.g., on a display unit). Alternatively or in addition, the disclosed UIs may be displayed to a user entity on a local device having a display (e.g., computer, tablet, mobile device). In some embodiments, a plurality of different UIs are implemented in order to display security data and/or analysis results to a user in a plurality of different visual contexts, thereby allowing the user to view diverse types of information as desired.

Figure 4:
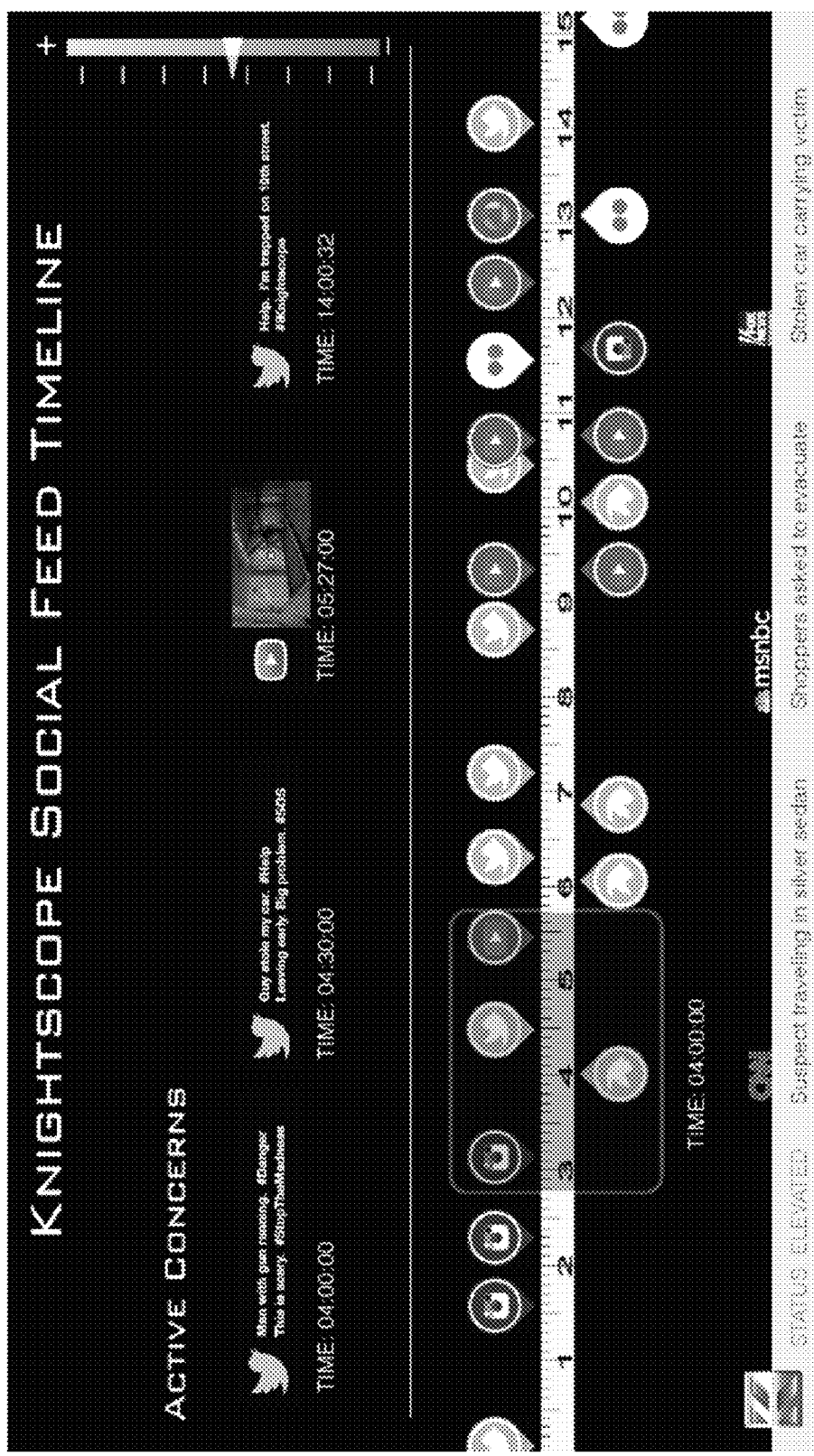
FIG. 4 illustrates a user interface for displaying a social media feed of security data, in accordance with embodiments.

FIG. 4 illustrates a UI for displaying a social media feed of security data, in accordance with embodiments. The UI can include a timeline along which icons representative of social media events (e.g., creation and/or posting of social media content) are situated in order to indicate their temporal relation to each other. The UI can include functionality for zooming in and out of the timeline (e.g., via a suitable zoom slider). In some embodiments, a user of the UI may be able to select certain regions of the timeline to view the events within that region in greater detail. For example, the events may be displayed above the timeline as images, video clips, text, or other graphical elements representing the key content of the event. The UI can include interactive links enabling the viewer to access the source of the social media from the UI.

Any suitable type of social media data can be displayed on the UI. Some example of social media data include blog posts, text messages (e.g., Twitter®), images (e.g., Instagram®, Flickr®, Picasa®), videos (e.g., Youtube®), and the like. In some embodiments, the social media data can be data that has been filtered, selected, or otherwise determined to be particularly relevant to security. The determination of relevant data for inclusion in the UI can be performed in any suitable manner. For example, social media data can be filtered for relevancy based on the geographical coordinates (e.g., latitude, longitude) associated with the content (e.g., a location from which a text message was sent, where an image was taken, etc.). The geographical filtering can employ techniques such as geo-fencing to select only social media data associated with a geographical region of interest. Alternatively or in addition, the social media data can be filtered based on the content of the data, such as the presence of specified key words, tags, or values; relevant images (e.g., determined using on image recognition algorithm), sounds, video clips; or any other suitable parameter.

Figure 5:
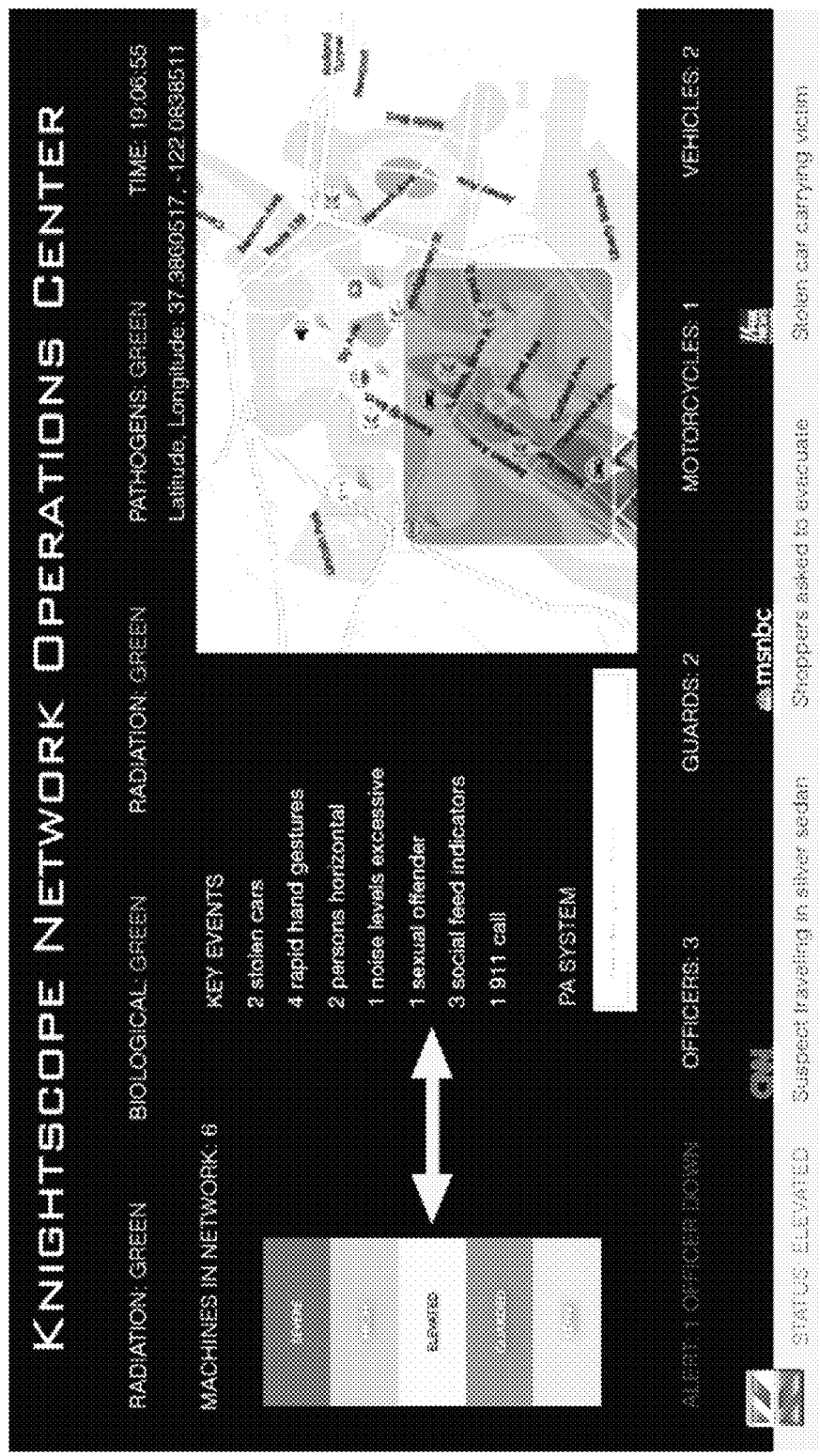
FIG. 5 illustrates a user interface for displaying a geographical map of security data, in accordance with embodiments.

FIG. 5 illustrates a UI for displaying a geographical map of security data, in accordance with embodiments. As previously mentioned, the map may provide a visual representation of a plurality of different security data types within a single geographical context. For example, security events can be represented on the map as icons indicating the location of their occurrence. Additionally, security-related social media data can also be represented on the map, and such social media data can be filtered for relevance, as previously described herein (e.g., via geo-fencing, key words, etc.). In some instances, the current position of one or more autonomous data machines can be displayed on the map. The UI can include functionality for zooming in and out of the map, such as zooming into a selected region of the map, in order to enable the viewer to examine the map at the desired level of detail. Additionally, in some embodiments, the map UI can be provided as part of a summary UI providing an overview of the current security status and/or any significant events. The summary UI may include information regarding the current status of different types of security threats (e.g., radiation, biological, pathogens, etc.), security activity (e.g., number of active security personnel, vehicles, autonomous data machines), and/or key events (e.g., occurrences of crimes or potentially crime-associated events).

In some embodiments, the map can be a heat map having color-coded indicators to represent the security alert level (or predicted security alert level) relative to various locations on the map. Examples of various security alert levels include "severe," "high," "elevated," "guarded," and "low." The heat map can be overlaid over other types of maps (e.g., a geographical map) such that the spatial disposition of the security alert level can be viewed relative to other types of security data. In some instances, the security alert level may influence the behavior of the underlying security data system. For example, when the alert level is determined to be above a critical level for a certain location, the system can be configured to automatically respond (e.g., notify all user entities having assets at the location, direct autonomous data machines to move to the location, contact security personnel situated at or near the location).

Figure 6:
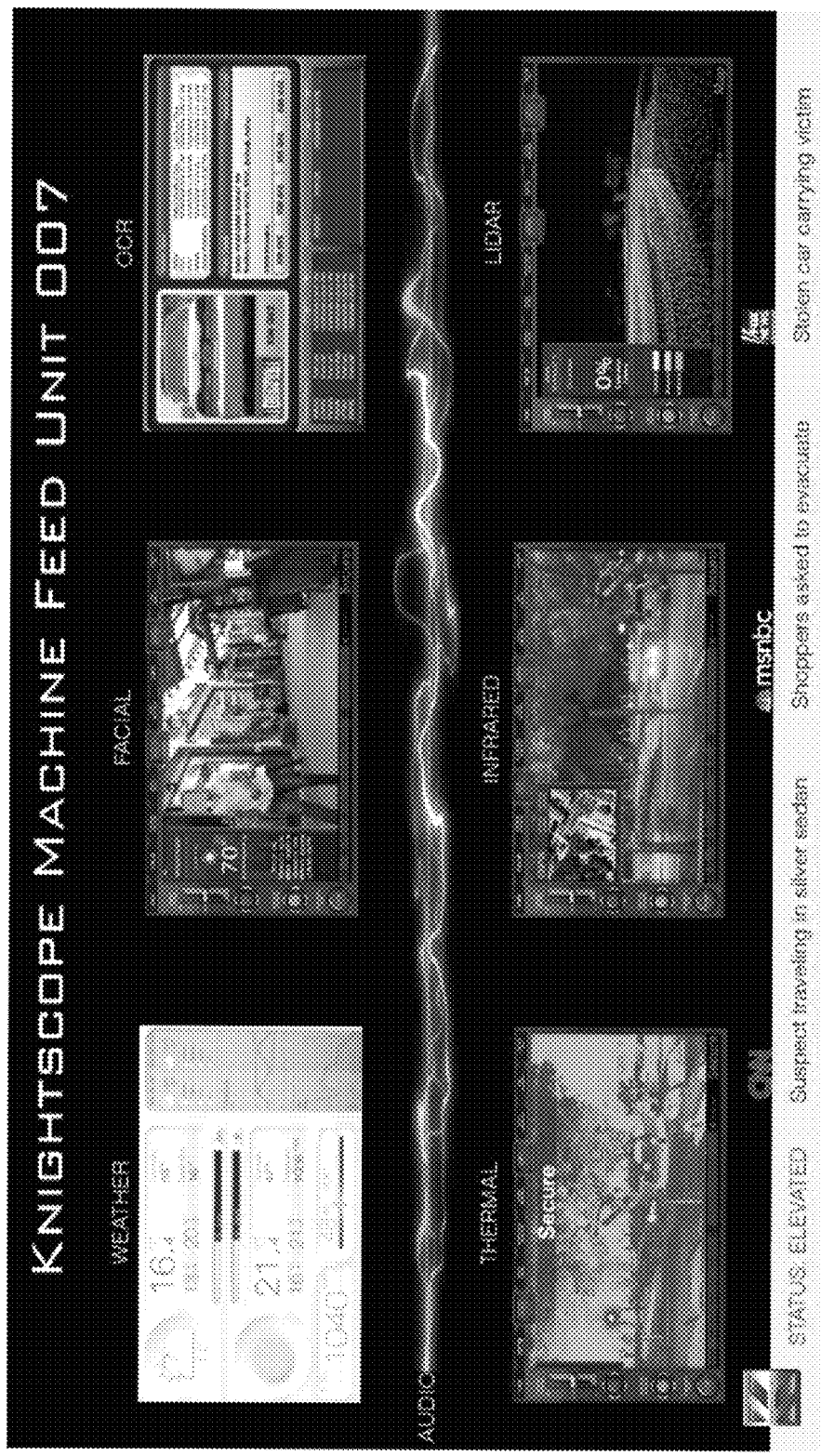
FIG. 6 illustrates a user interface for a sensor feed of security data, in accordance with embodiments.

FIG. 6 illustrates a UI for a sensor feed of security data, in accordance with embodiments. The sensor feed can display a visual representation of a plurality of different types of sensor data, such as weather data, facial recognition data, optical character recognition data, thermal data, infrared data, LIDAR data, and audio data. The feed may include the raw sensor data, processed data, and/or analytics performed on the sensor data (e.g., by the security data system). In some embodiments, the UI presents a real-time sensor feed of security data, thus enabling a security analyst to monitor and/or respond to occurrences at a remote location in real-time. The data can be obtained from one or more sensors of an autonomous data machine, as previously mentioned. Alternatively, the data can be provided by surveillance devices (e.g., fixed cameras) or other external sensors. The UI may simultaneously display security data from a plurality of different devices and/or machines. Alternatively, the UI may display data from a single device or machine only. In some instances, UI may enable the viewer to switch between sensor feeds from many different devices and/or machines.

Figure 7:
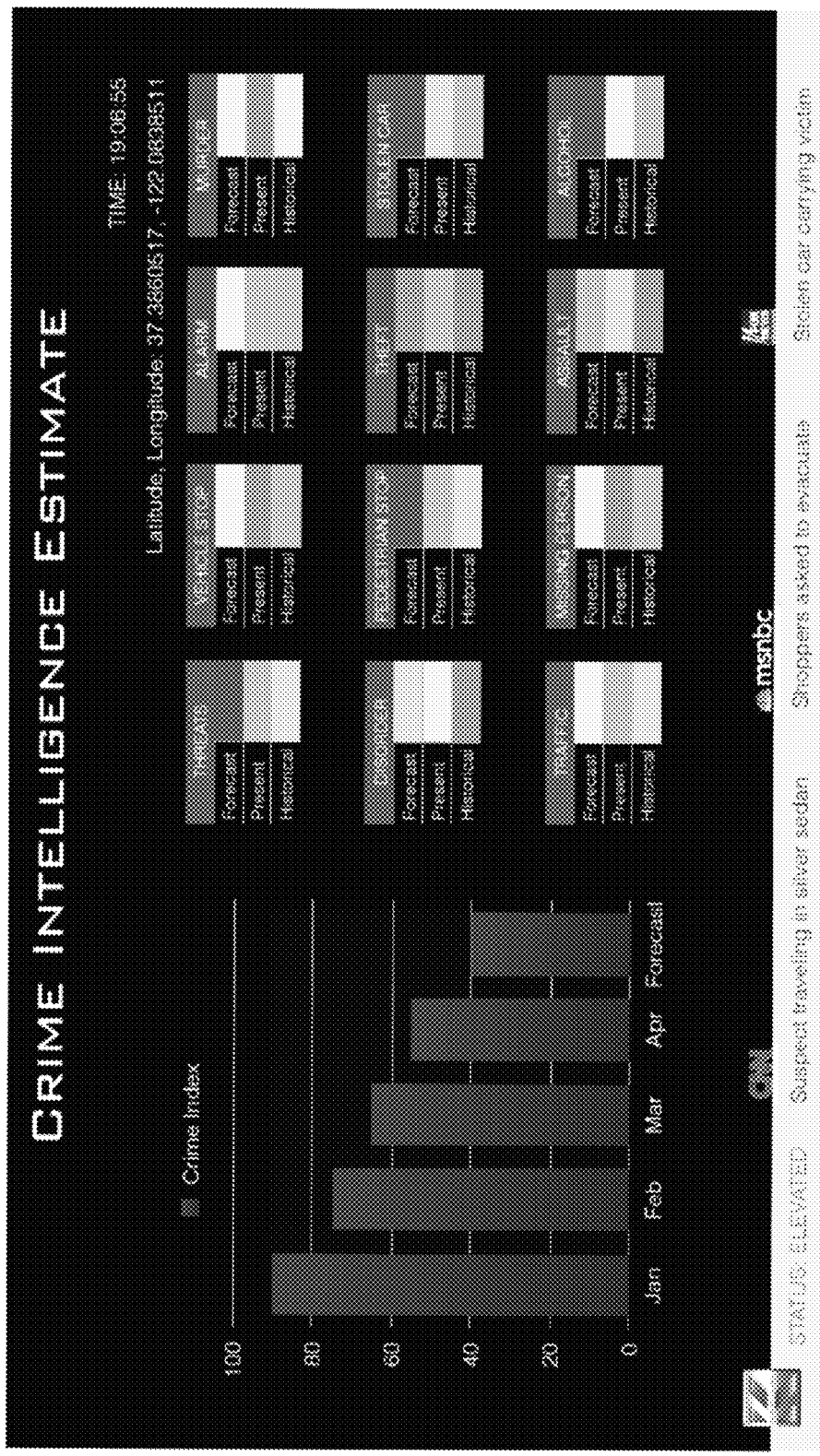
FIG. 7 illustrates a user interface for predictive security assessments, in accordance with embodiments.

FIG. 7 illustrates a UI for predictive security assessments ("crime intelligence estimate"), in accordance with embodiments. The UI may include historical, present, and/or predicted data for security-related events (e.g., crimes or crime-related events, such as threats, disorder, traffic, vehicle stops, pedestrian stops, missing persons, alarms, thefts, assaults, murders, stolen vehicles, alcohol, etc.). The information can be presented quantitatively (e.g., as a chart tracking the overall crime index over time) or qualitatively (e.g., color coding indicating the frequency of various crimes).

Figure 8:
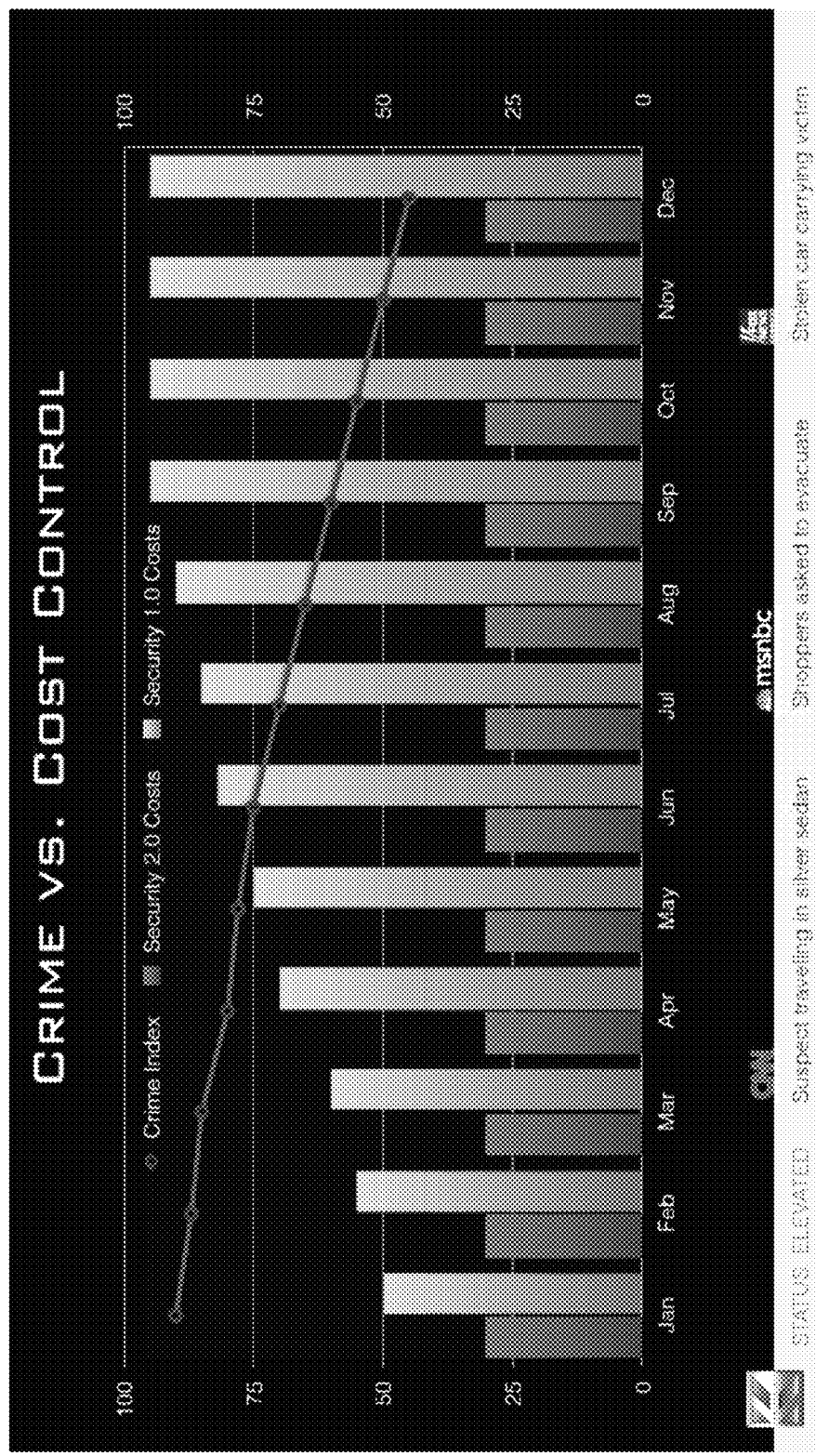
FIG. 8 illustrates a user interface for evaluating current security practices, in accordance with embodiments.

FIG. 8 illustrates a UI for evaluating current security practices, in accordance with embodiments. The UI can present any information relevant to evaluating and/or optimizing security practices, such as cost, frequency of events (e.g., crime index), resources, time, and the like. In some instances, the UI can include visual representations comparing the performance of a plurality of different security methodologies, such as graphs, charts, images, maps, and other graphical elements.

Figure 9:
FIG. 9 illustrates a user interface for monitoring the status of autonomous data machines, in accordance with embodiments.
Figure 9:

FIG. 9 illustrates a UI for monitoring the status of autonomous data machines. As previously mentioned, the security data systems described herein can be implemented as a part of control center for monitoring and/or directing the activities of autonomous data machines. Accordingly, security analysts may be provided with analytics representative of the current status of the autonomous data machines ("network health status.") For example, the status UI may include information regarding the amount of security data transmitted to the security data system by the data machines, whether any data machines are currently being charged, how many machines are currently connected to the system, how many machines are currently being serviced, the number of years the machines having been in service, version information for the control software implemented by the machines, and/or the total distance covered by the machines.

The various techniques described herein may be partially or fully implemented using code that is storable upon storage media and computer readable media, and executable by one or more processors of a computer system. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, solid state drives (SSD) or other solid state storage devices, or any other medium which can be used to store the desired information and which can be accessed by the a system device. Based on the disclosure and teachings provided herein, a person of ordinary skill in the art will appreciate other ways and/or methods to implement the various embodiments.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for detecting and responding to security events within a monitored environment, the system comprising:
   a self-propelled robotic autonomous data machine comprising: (1) one or more propulsion units including one or more wheels, movable body surfaces, propellers, rollers, arms, or legs configured to transport the self-propelled robotic autonomous data machine autonomously within the monitored environment, and (2) a sensor collecting data of the monitored environment; and
   one or more processors individually or collectively configured to:
      receive security data related to the monitored environment from a plurality of data sources, the plurality of data sources comprising: (1) the sensor of the autonomous data machine, and (2) a social media feed comprising a timeline of social media events and a geographical map of the social media events;

detect that a security event has occurred within the monitored environment, based on the security data from the sensor and social media feed, wherein the security event comprises at least one of the following: occurrence of a crime or occurrence of potential criminal activity;

determine an action to be performed by the self-propelled robotic autonomous data machine in response to detecting the security event from the sensor and the social media feed including at least in part navigating to a location associated with the security event and collecting data related to the security event using one or more sensors of the self-propelled autonomous data machine; and output a command to the autonomous data machine in order to cause the autonomous data machine to perform the action, wherein the one or more processors are situated at a location remote from the autonomous data machine.

2. The system of claim 1, wherein the sensor is an image sensor, an audio sensor, a thermal sensor, an infrared sensor, a proximity sensor, a motion sensor, or a position sensor.

3. The system of claim 1, wherein the sensor is carried by the self-propelled robotic autonomous data machine.

4. The system of claim 1, further comprising a display unit configured to display at least a subset of the security data to a user entity in a plurality of different visual contexts.

5. The system of claim 4, wherein the plurality of different visual contexts comprises one or more of the following: the geographical map, the timeline, the social media feed, or a sensor feed.

6. A method for detecting and responding to security events within a monitored environment using a self-propelled robotic autonomous data machine, the method comprising:

receiving, at one or more processors, security data related to the monitored environment from a plurality of data sources, the plurality of data sources comprising: (1) a sensor of the self-propelled robotic autonomous data machine, wherein the self-propelled robotic autonomous data machine comprises one or more propulsion units including one or more wheels, movable body surfaces, propellers, rollers, arms or legs configured to transport the self-propelled robotic autonomous data machine autonomously within the monitored environment, and (2) a social media feed comprising a timeline of social media events and a geographical map of the social media events;

detecting, with aid of the one or more processors, that a security event has occurred within the monitored environment, based on the security data from the sensor and social media feed, wherein the security event comprises at least one of the following: occurrence of a crime or occurrence of potential criminal activity;

determining, with aid of the one or more processors, an action to be performed by the self-propelled robotic autonomous data machine in response to detecting the security event from the sensor and social media feed including at least in part navigating to a location associated with the security event and collecting data related to the security event using one or more sensors of the self-propelled robotic autonomous data machine; and outputting, from the one or more processors, a command to the self-propelled robotic autonomous data machine in order to cause the self-propelled robotic autonomous data machine to perform the action, wherein the one or more processors are situated at a location remote from the self-propelled robotic autonomous data machine.

7. The method of claim 6, wherein the sensor is an image sensor, an audio sensor, a thermal sensor, an infrared sensor, a proximity sensor, a motion sensor, or a position sensor.

8. The method of claim 6, wherein the sensor is carried by the self-propelled robotic autonomous data machine.

9. The method of claim 6, wherein detecting that the security event has occurred comprises detecting an increase in activity related to the security event on the social media feed.

10. The method of claim 6, further comprising transmitting, with aid of the one or more processors, information regarding the security event to a user entity.

11. A system for responding to predicted security events within a monitored environment, the system comprising:

a self-propelled robotic autonomous data machine comprising: (1) one or more propulsion units including one or more wheels, movable body surfaces, propellers, rollers, arms or legs configured to transport the autonomous data machine autonomously within the monitored environment, and (2) a sensor collecting data of the monitored environment; and one or more processors individually or collectively configured to:

receive security data related to the monitored environment from a plurality of data sources, the plurality of data sources comprising: (1) the sensor of the self-propelled robotic autonomous data machine, and (2) a social media feed comprising a timeline of social media events and a geographical map of the social media events;

determine that a predicted security event is likely to occur within the monitored environment, based on the security data from the sensor and social media feed, wherein the predicted security event comprises at least one of the following: occurrence of a crime or occurrence of potential criminal activity;

determine an action to be performed by the autonomous data machine in response to determining the predicted security event is likely to occur from the sensor and timeline of social media events including at least in part navigating to a location associated with the security event and collecting data related to the security event using-one or more sensors of the self-propelled robotic autonomous data machine; and output a command to the self-propelled robotic autonomous data machine in order to cause the self-propelled robotic autonomous data machine to perform the action, wherein the one or more processors are situated at a location remote from the self-propelled robotic autonomous data machine.

12. The system of claim 11, wherein the sensor is an image sensor, an audio sensor, a thermal sensor, an infrared sensor, a proximity sensor, a motion sensor, or a position sensor.

13. The system of claim 11, wherein the sensor is carried by the self-propelled robotic autonomous data machine.

14. The system of claim 11, wherein the plurality of data sources further comprises a security database, and wherein the security database comprises historical security data for the monitored environment.

* * * * *